United States Patent Office 3,279,921
Patented Oct. 18, 1966

3,279,921
DIHYDROQUINOLINES ACTIVATED WITH
SULFUR CONTAINING AMINOACIDS
Ernest G. Jaworski, Olivette, Mo., assignor to Monsanto
Company, a corporation of Delaware
No Drawing. Filed Aug. 22, 1962, Ser. No. 218,549
16 Claims. (Cl. 99—2)

This invention relates to the activation of antioxidants. More particularly, the invention is directed to products which improve the preservation of vitamins in food stuffs and particularly in animal feeds and components thereof, which have heretofore been stabilized by the use of conventional antioxidants.

It is well known that the carotene in dehydrated alfalfa and other forage crops are subject to oxidation and loss of vitamins, particularly vitamin A, under normal storage and processing conditions. Furthermore, animal feeds which include the dehydrated forage crops and other vitamin containing components may undergo further decomposition, such that animals fed thereon are subject to malnutrition and more serious disabilities attributable to deficiencies in essential vitamins. It has also been found that many animals have the ability to store vitamins, and the longevity of retention of these vitamins for future use will be extended if antioxidants are included in the animal diets. The animal industry now regularly feeds antioxidants to animals as a feed component. The commercial manufacturers of prepared feeds also include antioxidants if the formulation includes vitamins and vitamin containing components, such as dehydrated alfalfa and other forage crops. Such feeds have the ability to retain their full nutrient qualities through the storage periods incident to normal marketing condtions.

Of the many known antioxidants, for example those developed by the rubber processing industry, only a few have been found to be useful for stabilization of vitamins. Of these the dihydroquinolines have been found to be very active and have been widely used in animal feeds. The most useful and more abundantly available dihydroquinolines are the 2,2,4-trimethyl-1,2-dihydroquinolines of the structure

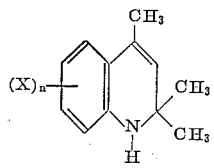

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms, and alkoxy radicals having up to 4 carbon atoms.

To determine the relative merits of antioxidants, many different procedures are used. Since many of the oxidations which the antioxidants are intended to retard are very slow reactions, accelerated procedures have been developed. Unfortunately, these are often arbitrary and frequently do not provide realistic evaluations or true indications of antioxidant properties. Obviously, test procedures should simulate conditions encountered in actual use of the substances to inhibit oxidations. However, accelerated tests, which are essential to a speedy and efficient acquisition of the critical data, may be used, if they are carefully calibrated with the actual oxidation reactions in the presence of a standard antioxidant of known quality.

To be most significant the antioxidant substances are screened to determine their ability to retard the oxidation of carotene. Under identical conditions, the effect of a standard antioxidant 6-ethoxy-2,2,4-trimethyl-1,2-dihydroquinoline in stabilizing carotene is also determined. Each candidate antioxidant is rated with respect to activity as a percentage of the activity of the standard antioxidant. The following activities of known antioxidants were determined by this procedure:

| Antioxidant: | Percent of standard compound activity |
|---|---|
| Butylated hydroxyl anisol | 28.2 |
| α-Tocopherol (vit. E) | 25.5 |
| Butylated hydroxy toluene | 17.5 |
| Propylgallate | 11.4 |

Although these antioxidants are of lower activity than the standard antioxidants, they also can be activated by the described procedure.

The purpose of the present invention is to provide methods of improving the vitamin protective properties of any and all antioxidants, and especially those above identified. Most particularly, the activity of the 2,2,4-trimethyl-1,2-dihydroquinolines may be increased. Specifically, the fundamental purpose of this invention is to provide a means of improving the 6-ethoxy-2,2,4-trimethyl-1,2-dihydroquinoline and to produce antioxidant compositions of superior activity in the preservation of vitamins in feed compositions.

It has been found that certain classes of compounds activate the antioxidant properties of even the best antioxidants. These activators are often not antioxidants, and many of them are pro-oxidants, promoting oxidation reactions instead of inhibiting the undesired oxidations. It has also been found that some compounds having mild antioxidant properties have the ability to greatly increase the antioxidant properties of the above described 2,2,4-trimethyl-1,2-dihydroquinolines, butylated hydroxyanisole, butylated hydroxytoluene, propyl, gallate and α-tocopherol.

Compounds in accordance with this invention which have the ability to activate antioxidants have the generic structure:

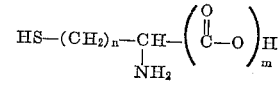

wherein $n$ is an integer from one to two and wherein $m$ is an integer from zero to one.

*Example*

The active compounds included within the scope of the generic structure, and near homologues of little or no activity, were studied by a standardized procedure to determine their ability to prevent or minimize the oxidation of carotene. The stabilizing ability of the standard antioxidant 6-ethoxy-2,2,4-trimethyl-1,2-dihydroquinoline was also determined to provide a suitable control. The data set forth below is the percentage of the antioxidant property of the standard antioxidant. The compounds were studied both alone and in a 1 to 3 proportion with the standard antioxidant. The following observations were made:

| Compound | Alone | 1 to 3 of Standard |
|---|---|---|
| 6-ethoxy-2,2,4-trimethyl-1,2-dihydroquinoline | 100 | |
| 1. Cysteine | −4.1 | 185.1 |
| 2. 2-aminomercapto butyric acid | −7.6 | 129.3 |
| 3. 2-mercapto ethylamine | −3.3 | 141.3 |
| 4. 2-hydroxyethylamine | 1.1 | 111.5 |
| 5. Serine | 1.1 | 106 |
| 6. 4-hydroxy-2-amino butyric acid | 0 | 98.5 |
| 7. Cystine | 12.2 | 110.8 |
| 8. 2-amino-4-thio-butyrolactone | −1.1 | 107.6 |

Of the above Nos. 1, 2 and 3 are included within the scope of the invention and are valuable activators for antioxidants. Compounds 4, 5, 6, 7 and 8 have little or no activity and are not included within the scope of the generic definition of useful activators. It is apparent that the replacement of the mercapto group with a hydroxyl radical reduces or destroys the antioxidant activator's property of the adjuvant.

Mixtures of the antioxidants and the activators as above described may be prepared in advance and use as such in preventing or controlling undersired oxidation reactions. When added to the substances which are subject to deleterious oxidation, they are useful in stabilizing said substances during preparation, storage or use. Generally, they are gradually consumed while they are effecting the stabilization. The compounds may be added to the substances being stabilized as separate components and mixing the composition to effect an intimate dispersion. Many compositions contain the substances to be stabilized as only minor components and the small amount of antioxidant used is difficult or impossible to attain the necessary degree of dispersion for effective control of the oxidation reactions.

It has been found that the antioxidant compositions are prepared by use of 5 to 95% of the antioxidants, such as 6-ethoxy-2,2,4-trimethyl-1,2-dihydroquinoline and from 95 to 5 percent of the active compound. Preferred compositions may contain the principal antioxidant in quantities such that the maximum is from 80 to 95% and the minimum from 5 to 20%, the balance of these compositions being the activating compound. It has been found that very large amounts of non-antioxidant activators may produce a diluting effect without a complete compensatory activation of the antioxidant. Some of the activators are in themselves antioxidants and these may provide additional antioxidant capacity as well as providing the more important activation effect.

The activated antioxidant compositions may be used in any application where oxidation produces undesirable effects. They may be used to prevent the aging of rubber and plastic compositions. They may be used to prevent decomposition of food products. Antioxidants are desirable in compositions containing unsaturated oils, subject to oxidation, and spoilage. A very important use is to prevent the normal loss of vitamins by oxidation in food stuffs or food components. Antioxidants are conventional in animal feeds and in this area finds one of its principal uses.

In the preparation of animal feeds conventional practice involves the incorporation of many substances subject to oxidative decomposition which destroy the nutrient values or render them less patentable. For example, oils with unsaturated components, dehydrated alfalfa, vitamin concentrates, tallow, soybean oil, tall oil, meals from oil processing industries, proteins and antibiotics. To prevent unwanted decomposition of the oxidizable components it is conventional to incorporate antioxidants. The use of these new activated antioxidant compositions will enable the desired stabilization with less antioxidant or a more efficient and longer lived stabilization with the use of conventional quantities.

In addition to the above mentioned components, animal feeds may include proteins, such as gelatin, casein, fish meal and slaughterhouse refuse; amino acids, such as glycine, methionine, the calcium salt of 2-hydroxy-4-methylthiobutyric acid and lysine; minerals, such as bone meal, salt, rock phosphate; and trace minerals, such as the salts of zinc, copper, manganese, magnesium, cobalt, iron and iodine; medicants, such as antibiotics, coccidistats, anthelmintics and steroids; cellulosive roughage components such as hay, straw, cottonseed hulls, cotton mill wastes, beet pulp, silage, ground corn cobs, corn salks, oats, barley, cereal brans and cereal middlings. Other conventional components well known to the animal raising arts may also be included in the finished feeds. In general, the invention may be practiced by replacing the normal antioxidant in any feed composition now in use with the activated antioxidant to attain the above-described beneficial results.

Although the invention is described with respect to specific modifications, it is not intended that the details thereof are limitations on the scope of the invention, except to the extent incorporated in the following claims.

The embodiments of the invention in which an exclusive property or privilege is claimed are defined as follows:

1. An improved antioxidant composition comprising an antioxidant of the formula

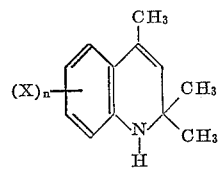

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms; and a compound of the formula

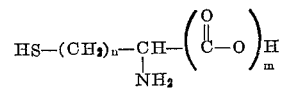

wherein $n$ is an integer from one to two and wherein $m$ is an integer from zero to one, said compound being present in an amount sufficient to provide an enhanced antioxidant property.

2. An improved antioxidant composition comprising a 6-ethoxy-2,2,4-trimethyl-1,2-dihydroquinoline and cysteine in an amount sufficient to provide an enhanced antioxidant property.

3. An improved antioxidant composition comprising a 6-ethoxy-2,2,4-trimethyl-1,2-dihydroquinoline and 2-mercapto ethylamine in an amount sufficient to provide an enhanced antioxidant property.

4. An improved antioxidant composition comprising a 6-ethoxy-2,2,4-trimethyl-1,2-dihydroquinoline and 4-mercapto-2-aminobutyric acid in an amount sufficient to provide an enhanced antioxidant property.

5. A method of stabilizing a substance subject to degradative oxidation which comprises adding to the said substance an antioxidant of the formula

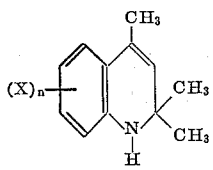

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms and a compound of the formula

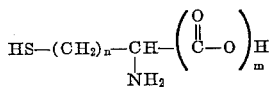

wherein $n$ is an integer from one to two and wherein $m$ is an integer from zero to one, said compound being present in an amount sufficient to provide an enhanced antioxidant property.

6. A method of stabilizing a substance subject to degradative oxidation which comprises adding to the said substances 6-ethoxy-2,2,4-trimethyl-1,2-dihydroquinoline; and cystein in an amount sufficient to provide an enhanced antioxidant property.

7. A method of stabilizing a substance subject to degradative oxidation which comprises adding to the said substances 6-ethoxy-2,24-trimethyl-1,2-dihydroquinoline; and 2-mercaptoethyl amine in an amount sufficient to provide an enhanced antioxidant property.

8. A method of stabilizing a substance subject to degradative oxidation which comprises adding to the said substances 6-ethoxy-2,2,4-trimethyl-1,2-dihydroquinoline; and 4-mercapto-2-aminobutyric acid in an amount sufficient to provide an enhanced antioxidant property.

9. A feed composition comprising at least one conventional feed component and a mixture of an antioxidant of the formula

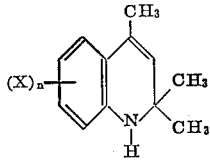

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms; and a compound of the formula

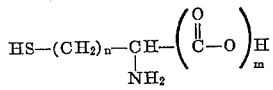

wherein $n$ is an integer from one to two and wherein $m$ is an integer from zero to one, said compound being present in an amount sufficient to provide an enhanced antioxidant property.

10. A feed composition comprising at least one conventional feed component, an antioxidant comprising 6-ethoxy-2,2,4-trimethyl-1,2,dihydroquinoline and an activating amount of cysteine in an amount sufficient to provide an enhanced antioxidant property.

11. A feed composition comprising at least one conventional feed component, an antioxidant comprising 6-ethoxy-2,2,4-trimethyl-1,2-dihydroquinoline and an activating amount of 2-mercapto ethylamine in an amount sufficient to provide an enhanced antioxidant property.

12. A feed composition comprising at least one conventional feed component, an antioxidant comprising 6-ethoxy-2,2,4-trimethyl-1,2,dihydroquinoline and an activating amount of 4-mercapto-2-aminobutyric acid in an amount sufficient to provide an enhanced antioxidant property.

13. A method of raising animals which comprises feeding said animals with a feed composition containing an antioxidant of the formula

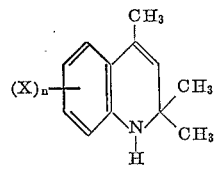

wherein $n$ is an integer from 0 to 2; wherein X is selected from the group consisting of chlorine, bromine and RO—; and wherein R is selected from the group consisting of hydrocarbon radicals of the class consisting of alkyl having 1 to 12 carbon atoms, alkenyl having up to 12 carbon atoms, alkynyl having up to 12 carbon atoms, the cycloalkyl having from 4 to 7 carbon atoms, benzyl and phenyl, and the said hydrocarbon radicals containing substituents of the class consisting of alkyl having up to 4 carbon atoms, alkenyl having up to 4 carbon atoms, alkynyl having up to 4 carbon atoms and alkoxy having up to 4 carbon atoms, and a compound of the formula

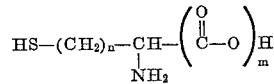

wherein $n$ is an integer from one to two and wherein $m$ is an integer from zero to one, said compound being present in an amount sufficient to provide an enhanced antioxidant property.

14. A method of raising animals which comprises feeding said animals with a feed composition containing as an antioxidant a mixture of 6-ethoxy-2,2,4-trimethyl-1,2-dihydroquinoline and cysteine, said cysteine being present in an amount sufficient to provide an enhanced antioxidant property.

15. A method of raising animals which comprises feeding said animals with a feed composition containing as an antioxidant a mixture of 6-ethoxy-2,2,4-trimethyl-1,2-dihydroquinoline and 2-mercapto ethylamine, said 2-mercaptoethylamine being present in an amount sufficient to provide an enhanced antioxidant property.

16. A method of raising animals which comprises feeding said animals with a feed composition containing as an antioxidant a mixture of 6-ethoxy-2,2,4-trimethyl-1,2-dihydroquinoline and 2-amino-4-mercaptobutyric acid, said 2-amino-4-mercaptobutyric acid being present in an amount sufficient to provide an enhanced antioxidant property.

(References on following page)

References Cited by the Examiner
UNITED STATES PATENTS

| | | | |
|---|---|---|---|
| 2,523,127 | 9/1950 | Lundberg | 99—163 X |
| 2,562,970 | 8/1951 | Thompson | 99—8 |
| 2,690,396 | 9/1954 | Chenicek | 99—163 X |
| 2,711,962 | 6/1955 | Bicloff | 99—8 |
| 2,935,449 | 5/1960 | Bavely | 99—2 |
| 2,980,599 | 4/1961 | Morse | 252—402 |
| 3,141,775 | 7/1964 | Surgant | 99—9 |
| 3,149,117 | 9/1964 | Brown | 252—402 |
| 3,155,521 | 11/1964 | Ward et al. | 99—2 |

A. LOUIS MONACELL, *Primary Examiner.*

D. DONOVAN, *Assistant Examiner.*